(12) United States Patent
Schaeffler et al.

(10) Patent No.: US 10,850,733 B2
(45) Date of Patent: Dec. 1, 2020

(54) METHOD FOR AUTOMATICALLY ADJUSTING THE VEHICLE SPEED

(71) Applicant: Robert Bosch GmbH, Stuttgart (DE)

(72) Inventors: Ralf Schaeffler, Steinheim (DE); Thomas Brettschneider, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 337 days.

(21) Appl. No.: 15/940,040

(22) Filed: Mar. 29, 2018

(65) Prior Publication Data

US 2018/0281792 A1 Oct. 4, 2018

(30) Foreign Application Priority Data

Mar. 31, 2017 (DE) .................. 10 2017 205 488

(51) Int. Cl.
| | |
|---|---|
| *B62D 6/00* | (2006.01) |
| *B60W 30/16* | (2020.01) |
| *G01S 17/08* | (2006.01) |
| *G01S 13/931* | (2020.01) |
| *B60T 7/22* | (2006.01) |

(Continued)

(52) U.S. Cl.
CPC ....... *B60W 30/162* (2013.01); *B60K 31/0008* (2013.01); *B60T 7/12* (2013.01); *B60T 7/22* (2013.01); *B60T 8/00* (2013.01); *B60T 8/17* (2013.01); *B60W 10/08* (2013.01); *B60W 10/184* (2013.01); *B60W 30/16* (2013.01); *B60W 30/18127* (2013.01); *G01S 13/08* (2013.01); *G01S 13/931* (2013.01); *G01S 15/00* (2013.01); *G01S 15/08* (2013.01); *G01S 15/931* (2013.01); *G01S 17/08* (2013.01); *G01S 17/931* (2020.01); *B60K 28/14* (2013.01); *B60K 2310/268* (2013.01); *B60T 2201/02* (2013.01); *B60T 2201/022* (2013.01); *B60T 2270/604* (2013.01); *B60W 2554/801* (2020.02); *B60W 2720/106* (2013.01); *B60W 2754/30* (2020.02);

(Continued)

(58) Field of Classification Search
CPC .......... B60W 30/162; B60W 2754/30; B60W 2554/801; B60W 2720/106; B60W 2720/10; B60W 30/18127; B60W 10/184; B60W 10/08; B60W 30/16; B60K 31/0008; B60K 2310/268; B60K 28/14; G01S 2013/9324; G01S 2013/9323; G01S 2013/9325; G01S 2013/9321; G01S 17/931; G01S 15/08; G01S 13/08; G01S 15/00; G01S 15/931; G01S 13/931; G01S 17/08; B60Y 2300/89; B60T 2201/02; B60T 2270/604; B60T 2201/022; B60T 8/00; B60T 8/17; B60T 7/22; B60T 7/12
USPC ...... 701/44, 93, 96, 113; 180/168, 170, 271; 340/435; 123/352
See application file for complete search history.

(56) References Cited

U.S. PATENT DOCUMENTS

| | | | |
|---|---|---|---|
| 9,637,125 B2 * | 5/2017 | Dextreit | .............. B60W 10/184 |
| 2002/0152015 A1 * | 10/2002 | Seto | ................... B60K 31/0008 |
| | | | 701/96 |

(Continued)

*Primary Examiner* — Shardul D Patel
(74) *Attorney, Agent, or Firm* — Norton Rose Fulbright US LLP; Gerard Messina

(57) ABSTRACT

In a method for automatically adjusting the vehicle speed of a vehicle, while the distance to a preceding other vehicle is continuously measured, in order to reduce an initial distance, the vehicle is initially moved, in a drive phase, at a higher vehicle speed and is subsequently decelerated in a braking phase.

16 Claims, 1 Drawing Sheet

(51) Int. Cl.
*B60T 8/17* (2006.01)
*G01S 15/931* (2020.01)
*G01S 15/00* (2020.01)
*B60T 8/00* (2006.01)
*G01S 13/08* (2006.01)
*G01S 15/08* (2006.01)
*B60W 10/08* (2006.01)
*B60W 10/184* (2012.01)
*B60W 30/18* (2012.01)
*G01S 17/931* (2020.01)
*B60K 31/00* (2006.01)
*B60T 7/12* (2006.01)
*B60K 28/14* (2006.01)

(52) U.S. Cl.
CPC ... *B60Y 2300/89* (2013.01); *G01S 2013/9321* (2013.01); *G01S 2013/9323* (2020.01); *G01S 2013/9324* (2020.01); *G01S 2013/9325* (2013.01)

(56) References Cited

U.S. PATENT DOCUMENTS

| | | | | |
|---|---|---|---|---|
| 2012/0150411 | A1* | 6/2012 | Oosawa | B60K 31/0008 701/96 |
| 2013/0226431 | A1* | 8/2013 | Lu | B60W 50/0098 701/96 |
| 2014/0159886 | A1* | 6/2014 | Hasegawa | B60W 50/14 340/435 |
| 2015/0307099 | A1* | 10/2015 | Dextreit | B60W 10/08 701/22 |
| 2016/0267726 | A1* | 9/2016 | Soo | B60L 7/10 |
| 2016/0297438 | A1* | 10/2016 | Han | B62D 15/025 |
| 2016/0332622 | A1* | 11/2016 | Shiraishi | B60W 10/04 |
| 2018/0050673 | A1* | 2/2018 | D'sa | B60T 7/22 |
| 2018/0111617 | A1* | 4/2018 | Stahl | B60W 30/143 |
| 2018/0319400 | A1* | 11/2018 | Kleinau | G08G 1/096791 |
| 2018/0370544 | A1* | 12/2018 | Kitagawa | G08G 1/167 |

* cited by examiner

METHOD FOR AUTOMATICALLY ADJUSTING THE VEHICLE SPEED

CROSS-REFERENCE TO RELATED APPLICATIONS

The present application claims priority under 35 U.S.C. § 119 to DE 10 2017 205 488.3, filed in the Federal Republic of Germany on Mar. 31, 2017, the content of which is hereby incorporated by reference herein in its entirety.

FIELD OF THE INVENTION

The present invention relates to a method for automatically adjusting the vehicle speed of a vehicle while the distance to a preceding other vehicle is continuously measured.

BACKGROUND

Distance control systems in vehicles are known, with the aid of which a speed-dependent setpoint distance between the vehicle and a preceding other vehicle is automatically maintained without driver intervention. The distance control system includes a radar system, with the aid of which the present distance between the vehicle and the preceding other vehicle can be ascertained. Depending on a comparison between the ascertained distance and the setpoint distance, the vehicle can be automatically accelerated in order to adjust the distance. Conversely, the vehicle is automatically decelerated when the preceding other vehicle reduces its speed.

SUMMARY

According to an example embodiment of the present invention, method automatically adjusts the vehicle speed of a vehicle while the distance to a preceding other vehicle is continuously measured. The initial distance between the vehicle and the preceding other vehicle is initially greater than a setpoint distance which is established in a speed-dependent manner, in particular. In order to reduce the initial distance to the setpoint distance, the vehicle is initially moved, in a drive phase, at a higher vehicle speed than the preceding other vehicle. This is followed by a braking phase which lasts until the setpoint distance is reached and at the end of which the speeds of the vehicle and the preceding other vehicle are adapted. During the braking phase, the speed of the vehicle is reduced with the aid of friction either within a unit of the vehicle or between the vehicle and the surroundings or, alternatively or additionally, with the aid of the generator mode of an electric motor situated in the drive train of the vehicle.

In the latter case, this is, for example, a hybrid drive, which includes at least one electric motor and, additionally, an internal combustion engine, the electric motor being used in addition to the internal combustion engine or as the only drive. An embodiment including one or multiple electric motor(s) as the exclusive drive of the vehicle is also possible. In any case, in the braking phase, at least one electric motor can be switched into the generator mode, in order to generate a braking force and to decelerate the vehicle to the target speed, i.e., the speed of the preceding other vehicle. In the generator mode, the electric motor-operated drive unit is in the recuperation mode, in which the vehicle battery can be charged.

During a deceleration with the aid of friction, use can be made not only of the air friction and the rolling friction between the wheels and the roadway, but also friction torques in the drive train, for example drag torques in an internal combustion engine which is utilized as the drive motor, and/or friction in an automatic transmission and/or a manual transmission.

It is therefore possible to reduce the vehicle speed to the target speed in the braking phase preferably exclusively with the aid of the friction and/or the generator mode of at least one electric motor. Advantageously, the braking system in the vehicle is not actuated in the braking phase, so that the speed reduction is carried out exclusively with the aid of the friction and/or the generator mode.

This procedure has the advantage that, on the one hand, the braking system is not loaded. On the other hand, the drive phase and the braking phase are matched to each other, in order to close a gap in the distance control mode, in such a way that the process is perceived as comfortable and is accepted by the driver. In order to implement the method, it suffices to establish a few parameters, such as, for example, the switch point from the drive phase to the braking phase, an advantage pf which is that the implementation of the function of the method in the vehicle can be carried out with relatively little application effort. Moreover, it is advantageous that the decelerations achieved during the braking phase can also be implemented, in most cases, without slip control under adverse surroundings conditions and roadway conditions. For the case in which slip control is required, however, in the method according to the present invention, the slip control can be additionally activated during the drive phase and/or the braking phase.

Advantageously, the vehicle is accelerated, in particular constantly accelerated, during the entire drive phase, whereby a high level of driving comfort is achieved and, simultaneously, a rapid closure of the gap between the vehicle and the preceding other vehicle is ensured.

The drive phase and the braking phase can last for different lengths of time, even though embodiments including equally long drive and braking phases are also possible.

In one preferred example embodiment, the vehicle undergoes an acceleration in the drive phase. In yet another example embodiment, the vehicle has a constant speed in the drive phase, which is higher, however, than the target speed of the preceding other vehicle. This situation occurs, for example, when the distance control function is activated in a driving situation including a manual driving operation, in which the speed of the vehicle is higher than the speed of the preceding other vehicle.

According to yet another advantageous example embodiment, which relates to an accelerated driving style during the drive phase of the vehicle, the maximum acceleration during the drive phase is determined as a function of that time period in which the function for automatically adjusting the vehicle speed is active and the setpoint distance and the target speed are reached, starting from the initial distance and the initial excess speed of the vehicle. The maximum acceleration can also depend on the maximum deceleration which can be implemented during the braking phase.

The maximum acceleration, which is carried out in the drive phase up to the switch point from the drive phase to the braking phase, can be determined from kinematic relationships as a function of the initial excess speed of the vehicle, the vehicle deceleration in the braking phase—both the acceleration as well as the deceleration advantageously being carried out with constant values, the initial distance, and the time duration which is required to reach the setpoint distance and the target speed starting from the initial distance and the initial excess speed. When the switch point, the maximum acceleration, the maximum deceleration, the initial distance, and the initial excess speed are known, all determination variables required for carrying out the method for automatically adjusting the vehicle speed have been established. In this case, it suffices to determine the vehicle speed as well as the distance to the preceding other vehicle with the aid of sensors, where the speed of the preceding other vehicle as well as the relative or excess speed of the vehicle can be determined from multiple distance measurements.

According to yet another advantageous example embodiment, the distance between the vehicle and the preceding other vehicle can be automatically increased when a defined event is present, for example, in order to allow yet another road user to merge into the space between the vehicle and the preceding other vehicle. This further road user subsequently constitutes the preceding other vehicle, with respect to which the vehicle now orients itself in terms of the setpoint distance and the target speed. In order to increase the distance, a braking phase is initially carried out and, subsequent thereto, in order to reduce the distance to this further road user, a drive phase can be carried out again, which is followed, in particular, by a further braking phase, where the drive phase and the further braking phase can be carried out according to the method according to the present invention, as described above. The first braking phase, which is carried out for increasing the distance, and the subsequent drive phase can be carried out similarly to the gap closure, though in reverse order.

The different method steps are advantageously carried out in a control unit in the vehicle, which can be, in particular, a component of a distance control system in the vehicle. Moreover, the distance control system is equipped with a distance-ascertaining system, with the aid of which the distance between the vehicle and the preceding other vehicle can be ascertained. This is preferably a radar-assisted distance-ascertaining system, other distance-ascertaining systems also being possible, if necessary, in particular based on video, ultrasound, or LIDAR.

Further advantages and advantageous embodiments are to be derived from figures, description of thereof, and the claims.

DETAILED DESCRIPTION

Figure 1:
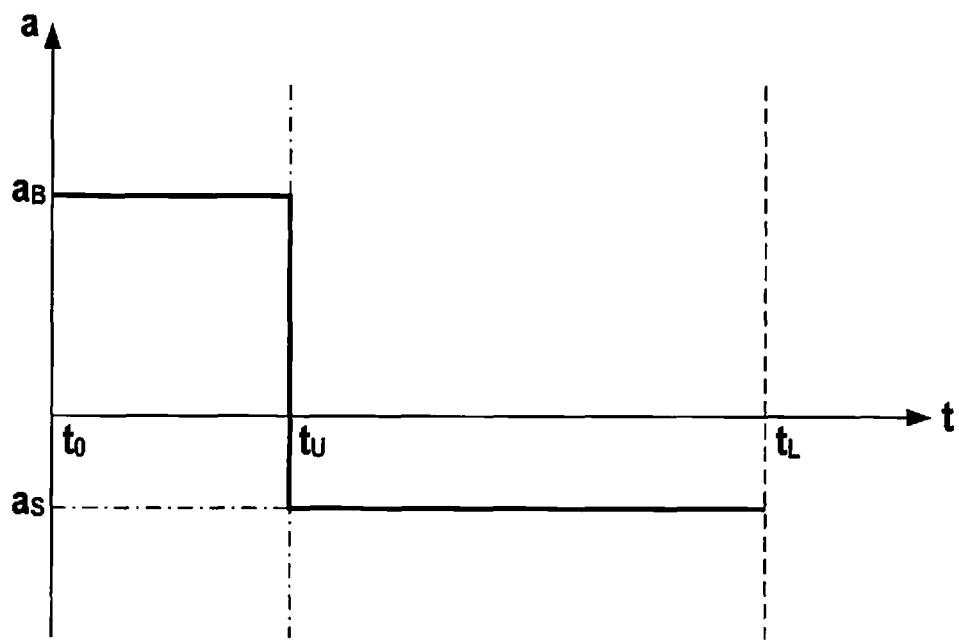
FIG. 1 shows the acceleration/deceleration curve as a function of time during a reduction of the distance to a preceding other vehicle, according to an example embodiment of the present invention.

FIG. 1 relates to a method for automatically adjusting the vehicle speed of a vehicle while the distance to a preceding other vehicle is continuously measured, where a greater initial distance between the vehicle and the preceding other vehicle is to be reduced to a smaller setpoint distance. Upon the activation of the distance control function, the actual initial distance is therefore greater than the setpoint distance. The initial speed of the vehicle can possibly be greater than the speed of the preceding other vehicle, even though embodiments are also possible, in which the initial speed of the vehicle is equal to or less than the speed of the preceding other vehicle.

In order to reduce the initial distance to the setpoint distance which is determined, in particular, depending on speed, a drive phase is initially carried out, while the distance between the vehicle and the preceding other vehicle is continuously measured, between initial point in time $t_0$ and a switch point $t_U$ which marks the switch from the drive phase to a subsequent braking phase which lasts up to point in time $t_L$. $t_L$ also stands for the entire time period for carrying out the method until the setpoint distance and the target speed of the vehicle, which matches the speed of the preceding other vehicle, have been reached.

The continuous distance measurement in the distance control system of the vehicle is preferably carried out with the aid of a distance radar system. Alternatively, other distance-ascertaining systems are also possible, which function, for example, in a video-based manner or on the basis of ultrasound or LIDAR.

In the drive phase, the vehicle has, at least in sections, a higher speed than the preceding other vehicle, in order to reduce the greater initial distance to the setpoint distance. Switch point $t_U$ can be predefined and covers, for example, a period of time from 10 ms to 100 s and is preferably between 500 ms and 1 s, measured starting at initial point in time $t_0$. Vehicle deceleration $a_S$ in the braking phase between switch point $t_U$ and the final point in time or entire time period $t_L$ until the setpoint distance is reached can also be predefined and is in the magnitude, for example, up to $-4$ m/s$^2$, in particular between $-0.1$ m/s$^2$ and $-0.5$ m/s$^2$.

Vehicle deceleration as in the braking phase between $t_U$ and $t_L$ is preferably carried out without actuation of the hydraulic braking system and is based exclusively on friction or on the generator mode of an electric motor situated in the drive train of the vehicle. The friction is related, in particular, to the air resistance, the rolling friction between the wheels and the roadway, and internal drag torques of an internal combustion engine or friction in general in the drive train, in particular in the transmission. Provided an electric motor is situated in the drive train, the electric motor is operated and recuperated in the generator mode, as a result of which a significant deceleration can be achieved in the braking phase.

At the beginning of the method, with the aid of the distance determination system, initial distance $s(t_0)$ is initially determined at initial point in time to as well as differential speed $\Delta v(t_0)$, where the trailing vehicle can have a speed which is greater than, less than, or equal to that of the preceding other vehicle at the point in time of the activation of the distance control system. On the basis of this information, time period $t_L$ can be determined, which, with the aid of the present speed (in the case of an initial excess speed), is required for reducing initial distance $s(t_0)$ to setpoint distance $s_d$.

Maximum acceleration $a_B$, which is carried out in the drive phase between $t_0$ and $t_U$, can be determined, on the condition of a uniform acceleration, with the aid of the following relationships:

$$0 = s(t_0) + \Delta v(t_0) \cdot (t_U - t_0) + \tfrac{1}{2} a_B \cdot (t_U - t_0)^2;$$

$$0 = \Delta v(t_0) + a_B \cdot (t_U - t_0);$$

$$0 = s(t_U) + \Delta v(t_U) \cdot (t_L - t_U) + \tfrac{1}{2} a_S \cdot (t_L - t_U)^2; \text{ and}$$

$$0 = \Delta v(t_U) + a_S \cdot (t_L - t_U).$$

As is apparent from FIG. 1, acceleration value $a_B$ is applied, as a constant acceleration, via the drive motor in the vehicle in the drive phase between $t_0$ and $t_U$.

At switch point $t_U$, the switch from the drive phase to the braking phase takes place, in which no further drive torque is generated and, instead, a braking force is generated, although not with the aid of the vehicle's own braking system, but rather, as described above, via friction, drag torques, and/or the generator mode of an electric motor situated in the drive train. Deceleration as is also advantageously constant across the entire time period of the braking phase.

At point in time $t_L$, the braking phase is concluded, the distance between the vehicle and the preceding other vehicle corresponds to the setpoint distance, and the vehicle speed corresponds to the target speed (speed of the preceding other vehicle).

Figure 2:
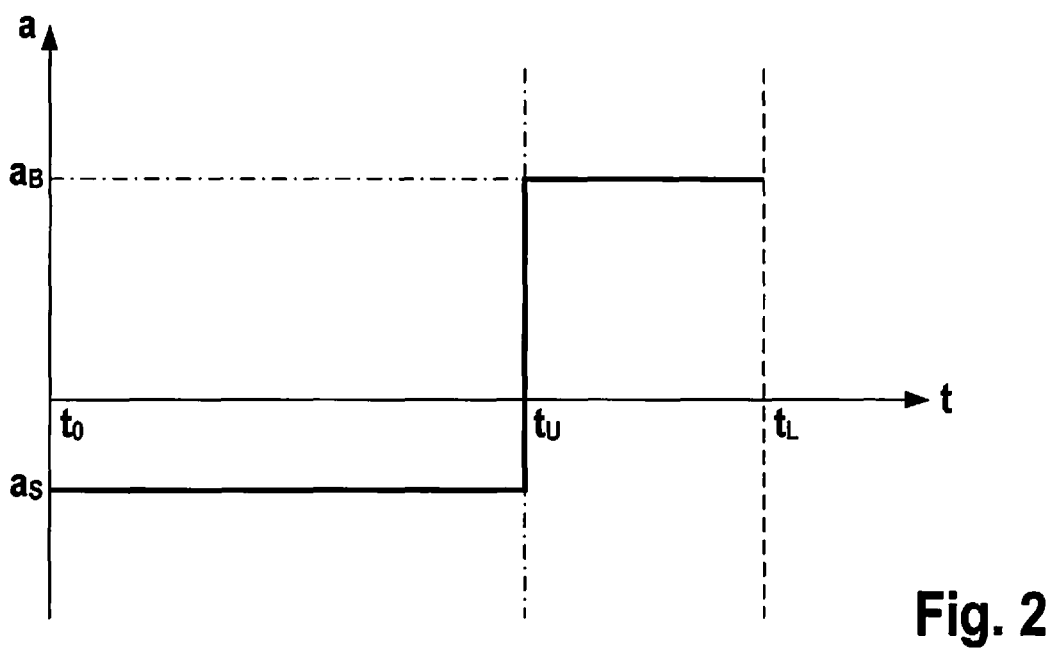
FIG. 2 shows an acceleration/deceleration diagram as a function of time as the distance to a preceding other vehicle increases, according to an example embodiment of the present invention.

In FIG. 2, the method for increasing the distance to a preceding other vehicle is represented, for example, in order to allow yet another road user to merge into the gap between the vehicle and the preceding other vehicle. Similarly to FIG. 1, entire time period $t_L$ is subdivided into a braking phase between $t_0$ and $t_U$ and a drive phase between $t_U$ and $t_L$. In the initial braking phase, a constant deceleration as is applied, which, if necessary, can be equal to deceleration $a_S$ of FIG. 1. The subsequent drive phase between $t_U$ and $t_L$ takes place at constant acceleration $a_B$ which, if necessary, can also be as great as acceleration $a_B$ in FIG. 1. Switch point $t_U$ is predefined as a value and is in a value range, for example, between 0.1 s and 5 s, preferably between 0.5 s and 2 s.

The acceleration phase between $t_U$ and $t_L$ can be followed, in turn, by a braking phase similar to FIG. 1, in order to adjust the desired setpoint distance and the target speed of the vehicle to the further road user which has merged into the gap.

What is claimed is:

1. A method for automatically adjusting a speed of a first vehicle while a distance of the first vehicle to a second vehicle that leads the first vehicle is continuously measured, the method comprising:
   responsive to the distance being a first distance that is greater than a setpoint distance, reducing the distance from the first distance to the setpoint distance by:
   in a drive phase, a processor driving the first vehicle at a higher vehicle speed than the second vehicle; and
   in a braking phase that is subsequent to the drive phase, the processor initiating and then maintaining a deceleration of the first vehicle using at least one of friction and a generator mode of an electric motor situated in a drive train of the vehicle until the distance equals the setpoint distance and the speeds of the first and second vehicles match.

2. The method of claim 1, wherein the vehicle is accelerated during the entire drive phase.

3. The method of claim 2, wherein the acceleration of the vehicle during the entire drive phase is with a constant acceleration.

4. The method of claim 1, wherein a maximum acceleration during the drive phase is determined based on a time period required to reach the setpoint distance between the first and second vehicles, starting from a time at which the distance has an initial distance value and at which there is an initial difference between speeds of the first and second vehicles.

5. The method of claim 1, wherein the vehicle is decelerated in the braking phase exclusively using the at least one of the friction and the generator mode.

6. The method of claim 1, wherein a point in time at which a switch is made from the drive phase to the braking phase is determined as a function of a braking ability using the at least one of the friction and the generator mode.

7. The method of claim 1, wherein:
   a point in time ($t_U$) at which a switch is made from the drive phase to the braking phase is determined based on one or more of the following relationships:

$$0 = s(t_0) + \Delta v(t_0) \cdot (t_U - t_0) + \tfrac{1}{2} a_B \cdot (t_U - t_0)^2;$$

$$0 = \Delta v(t_0) + a_B \cdot (t_U - t_0);$$

$$0 = s(t_U) + \Delta v(t_U) \cdot (t_L - t_U) + \tfrac{1}{2} a_S \cdot (t_L - t_U)^2; \text{ and}$$

$$0 = \Delta v(t_U) + a_S \cdot (t_L - t_U);$$

$t_0$ is an initial point in time at which the drive phase is begun;
   $t_L$ is a point in time when the setpoint distance is reached;
   $s(t_0)$ is the distance between the first and second vehicles at $t_0$;
   $s(t_U)$ is the distance between the first and second vehicles at $t_U$;
   $\Delta v(t_0)$ is a difference in speeds between the first and second vehicles at $t_0$;
   $\Delta v(t_U)$ is the difference in speeds of the first and second vehicles at $t_U$;
   $a_B$ is a value of an acceleration of the first vehicle during the drive phase; and
   $a_S$ is a value of a deceleration of the first vehicle during the braking phase.

8. The method of claim 1, further comprising automatically increasing the distance between the first and second vehicles in response to occurrence of a predefined event.

9. The method of claim 1, further comprising automatically increasing the distance between the first and second vehicles in response to a third vehicle being detected as beginning to merge into a location in a lane of the first and second vehicles that is between the first and second vehicles.

10. The method of claim 1, further comprising, in response to a third vehicle being detected as beginning to merge into a location in a lane of the first and second vehicles that is between the first and second vehicles, automatically carrying out a braking phase to increase the distance between the first and second vehicles and then carrying out the drive phase to decrease a distance between the first and third vehicles.

11. The method of claim 1, wherein the driving of the first vehicle is performed by accelerating the first vehicle throughout the drive phase at a constant acceleration rate until a switchover point in time at which the first vehicle is switched from the drive phase to the braking phase, and the deceleration is performed by decelerating the vehicle at a constant deceleration rate throughout the braking phase.

12. The method of claim 1, wherein parameters of the drive phase and the braking phase are set to satisfy one or more of the following relationships $$0 = s(t_0) + \Delta v(t_0) \cdot (t_U - t_0) + \tfrac{1}{2} a_B \cdot (t_U - t_0)^2;$$

$$0 = \Delta v(t_0) + a_B \cdot (t_U - t_0);$$

$$0 = s(t_U) + \Delta v(t_U) \cdot (t_L - t_U) + \tfrac{1}{2} a_S \cdot (t_L - t_U)^2; \text{ and}$$

$$0 = \Delta v(t_U) + a_S \cdot (t_L - t_U);$$

$t_0$ is an initial point in time at which the drive phase is begun;

$t_U$ is a point in time at which a switch is made from the drive phase to the braking phase;

$t_L$ is a point in time when the setpoint distance is reached;

$s(t_0)$ is the distance between the first and second vehicles at $t_0$;

$s(t_U)$ is the distance between the first and second vehicles at $t_U$;

$\Delta v(t_0)$ is a difference in speeds between the first and second vehicles at $t_0$;

$\Delta v(t_U)$ is the difference in speeds of the first and second vehicles at $t_U$;

$a_B$ is a value of an acceleration of the first vehicle during the drive phase; and $a_S$ is a value of a deceleration of the first vehicle during the braking phase.

13. The method of claim 1, wherein parameters of the drive phase and the braking phase are set to satisfy all of the following relationships:

$$0 = s(t_0) + \Delta v(t_0) \cdot (t_U - t_0) + \tfrac{1}{2} a_B \cdot (t_U - t_0)^2;$$

$$0 = \Delta v(t_0) + a_B \cdot (t_U - t_0);$$

$$0 = s(t_U) + \Delta v(t_U) \cdot (t_L - t_U) + \tfrac{1}{2} a_S \cdot (t_L - t_U)^2; \text{ and}$$

$$0 = \Delta v(t_U) + a_S \cdot (t_L - t_U);$$

$t_0$ is an initial point in time at which the drive phase is begun;

$t_U$ is a point in time at which a switch is made from the drive phase to the braking phase;

$t_L$ is a point in time when the setpoint distance is reached;

$s(t_0)$ is the distance between the first and second vehicles at $t_0$;

$s(t_U)$ is the distance between the first and second vehicles at $t_U$;

$\Delta v(t_0)$ is a difference in speeds between the first and second vehicles at $t_0$;

$\Delta v(t_U)$ is the difference in speeds of the first and second vehicles at $t_U$;

$a_B$ is a value of an acceleration of the first vehicle during the drive phase; and $a_S$ is a value of a deceleration of the first vehicle during the braking phase.

14. A system comprising a control unit with an interface by which the processor can control a first vehicle, wherein the control unit is configured to perform a method for automatically adjusting a speed of the first vehicle while a distance of the first vehicle to a second vehicle that leads the first vehicle is continuously measured, the method comprising:

responsive to the distance being a first distance that is greater than a setpoint distance, reducing the distance from the first distance to the setpoint distance by:
  in a drive phase, controlling the first vehicle to drive at a higher vehicle speed than the second vehicle; and
  in a braking phase that is subsequent to the drive phase, initiating and then maintaining a deceleration of the first vehicle using at least one of friction and a generator mode of an electric motor situated in a drive train of the vehicle until the distance equals the setpoint distance and the speeds of the first and second vehicles match.

15. The system of claim 14, further comprising a sensor communicatively coupled to the processor and from which the processor obtains values of the distance.

16. A first vehicle comprising a system that includes a sensor and a control unit communicatively coupled to the sensor, wherein the control unit is configured to perform a method for automatically adjusting a speed of the first vehicle while a distance of the first vehicle to a second vehicle that leads the first vehicle is continuously measured by the sensor, the method comprising:

responsive to the distance, as indicated by a signal of the sensor, being a first distance that is greater than a setpoint distance, reducing the distance from the first distance to the setpoint distance by:
  in a drive phase, controlling the first vehicle to drive at a higher vehicle speed than the second vehicle; and
  in a braking phase that is subsequent to the drive phase, initiating and then maintaining a deceleration of the first vehicle using at least one of friction and a generator mode of an electric motor situated in a drive train of the vehicle until the distance equals the setpoint distance and the speeds of the first and second vehicles match.

* * * * *